United States Patent
Lien et al.

(10) Patent No.: US 12,469,618 B2
(45) Date of Patent: Nov. 11, 2025

(54) TRANSPARENT CONDUCTIVE FILM

(71) Applicant: Pine Castle Investments Limited, Tortola (VG)

(72) Inventors: Siou-Cheng Lien, Miaoli County (TW); Chia-Yang Tsai, New Taipei (TW); Chi-Fan Hsiao, Taoyuan (TW)

(73) Assignee: Pine Castle Investments Limited, Tortola (VG)

( * ) Notice: Subject to any disclaimer, the term of this patent is extended or adjusted under 35 U.S.C. 154(b) by 548 days.

(21) Appl. No.: 17/979,044

(22) Filed: Nov. 2, 2022

(65) Prior Publication Data
US 2024/0145119 A1    May 2, 2024

(51) Int. Cl.
*H01B 5/14* (2006.01)
*B82Y 30/00* (2011.01)
*H01B 1/22* (2006.01)

(52) U.S. Cl.
CPC .............. *H01B 5/14* (2013.01); *H01B 1/22* (2013.01); *B82Y 30/00* (2013.01)

(58) Field of Classification Search
CPC ........................................................ H01B 5/14
See application file for complete search history.

(56) References Cited

U.S. PATENT DOCUMENTS

| | | | |
|---|---|---|---|
| 4,297,004 A * | 10/1981 | Nishimura | G02F 1/1345 349/122 |
| 8,454,721 B2 | 6/2013 | Allemand | |
| 9,672,950 B2 * | 6/2017 | Sepa | C09D 7/61 |
| 2010/0178583 A1 | 7/2010 | Han et al. | |
| 2017/0336831 A1 * | 11/2017 | Zhang | G06F 3/0446 |
| 2020/0174622 A1 * | 6/2020 | Varjos | H05K 1/0289 |
| 2023/0227618 A1 * | 7/2023 | Okuyama | B32B 9/045 427/412.5 |

FOREIGN PATENT DOCUMENTS

TW    202231795 A    8/2022

* cited by examiner

*Primary Examiner* — William D Young
(74) *Attorney, Agent, or Firm* — Cooper Legal Group, LLC

(57) ABSTRACT

A transparent conductive film comprises a substrate, a metal nanowire layer disposed on the substrate, and a water blocking protective layer, which has water absorbing particles and is disposed on the metal nanowire layer. The transparent conductive film has a first absorption peak in a 2750 cm$^{-1}$ to 3000 cm$^{-1}$ wavenumber region and a second absorption peak in a 3000 cm$^{-1}$ to 3750 cm$^{-1}$ wavenumber region using FTIR detection. A ratio of a maximum peak intensity of the second absorption peak to a maximum peak intensity of the first absorption peak ranges from 0.18 to 0.50, and a haze value of the transparent conductive film is 1.7% or less. The transparent conductive film can overcome the problems of poor bending resistance and visibility and can be appropriately applied to touch sensors due to bendability and high water blocking performance of the transparent conductive film.

9 Claims, 5 Drawing Sheets

TRANSPARENT CONDUCTIVE FILM

BACKGROUND

1. Field of the Disclosure

The present disclosure relates to a transparent conductive film, and in particular to a transparent conductive film containing silver nanowires that has bendability and high water blocking performance.

2. Description of the Related Art

Conventionally, a transparent conductive film including a nano-silver wire layer has been used in the touch sensing electrode of a touch sensor.

For example, Taiwan patent number TWI675895 discloses a transparent conductive sheet, which at least includes a conductive layer using a metal material as a conductive substance, and an adhesive layer in contact with the conductive layer. Further, the adhesive layer includes an acrylic copolymer containing a hydrophilic acrylic monomer as a comonomer component, and at least one migration inhibitor selected from the group consisting of a moisture absorbent agent and a metal ion scavenger.

Thereby, the transparent conductive sheet of Taiwan patent number TWI675895 can suppress the occurrence of disconnection or short circuit due to the migration of the metal material constituting the conductive layer.

However, since the position of the touch sensing electrode exists in the visible area of the touch panel, in the prior art, such as Taiwan patent number TWI675895, the hydrophilic monomer concentration of the adhesive layer is usually as high as 15% or more, which will affect the visibility of the electrode (including visible light transmittance and haze). In addition, the moisture absorbing agent, metal ion trapping agent, etc. contained in the adhesive layer will also affect the visibility of the electrodes, thereby adversely affecting the visibility of the entire touch panel.

BRIEF SUMMARY OF THE DISCLOSURE

The thickness of the adhesive layer is also related to the visibility of the overall touch electrodes. Based on this, how to maintain the electrical properties of the conductive film and excellent visibility while having the function of bending resistance has become an urgent problem to be solved.

In order to solve the above problems and more, the present disclosure includes an aspect of the transparent conductive film, which includes a substrate, a metal nanowire layer disposed on the substrate, and a water blocking protective layer, which has water absorbing particles and is disposed on the metal nanowire layer. The transparent conductive film has a first absorption peak in a 2750 cm$^{-1}$ to 3000 cm$^{-1}$ wavenumber region and a second absorption peak in a 3000 cm$^{-1}$ to 3750 cm$^{-1}$ wavenumber region using Fourier-transform infrared spectroscopy (FTIR) detection. A ratio of a maximum peak intensity of the second absorption peak to a maximum peak intensity of the first absorption peak (the second absorption peak/the first absorption peak) ranges from 0.18 to 0.50. A haze value of the transparent conductive film is 1.7% or less.

In an embodiment, a ratio of a spectral integrated area of the first absorption peak to a spectral integrated area of the second absorption peak ranges from 0.618 to 1.410.

In an embodiment, the transparent conductive film includes a plurality of electrodes formed by metal nanowires.

In an embodiment, a gap distance between the plurality of electrodes ranges from 30 μm to 200 μm.

In an embodiment, under test conditions of direct current, a voltage of 5V, and a high temperature and high humidity environment of 85° C./85%, when the gap distance is x μm and the power is on for y hr, a wire resistance change rate of the transparent conductive film is lower than 10%, wherein x and y conform to the following relationship: y=0.53179x+364.47977.

In an embodiment, under test conditions of direct current, a voltage of 5V, and a high temperature and high humidity environment of 85° C./85%, when the power is on for 400 hr, a wire resistance change rate of the transparent conductive film is lower than 10%.

In an embodiment, a visible light transmittance of the transparent conductive film ranges from 92% to 97%.

In an embodiment, a yellowness (b*) of the transparent conductive film is below 0.5.

In an embodiment, a thickness of the water blocking protective layer ranges from 1 μm to 15 μm.

In an embodiment, a volume percentage of the water absorbing particles in the water blocking protective layer ranges from 1% to 5%.

The transparent conductive film of the present disclosure can overcome the problems of poor bending resistance and inferior visibility of the transparent conductive film of the prior art, and can be appropriately applied to touch sensors because the transparent conductive film of the present disclosure has the advantages of increased bendability and high water blocking performance.

DETAILED DESCRIPTION OF THE DISCLOSURE

The following describes the implementation of the present disclosure by specific embodiments, and people having ordinary skill in the art can understand other advantages and effects of the present disclosure from the content disclosed in this specification. The present disclosure can also be implemented or applied by other different embodiments, and various details in this specification can also be modified and changed based on different viewpoints and applications without departing from the spirit of the present disclosure.

Unless otherwise specified in the context, the singular forms "a" and "the" used in the specification and the appended claims include plural meanings.

Unless otherwise specified in the context, the term "or" used in the specification and the appended claims includes the meaning of "and/or".

Unless otherwise specified in the context, the terms "A-B" used in the specification and the appended claims include the meanings of "above A and below B". For example, the term "30-150 µm" includes the meaning of "30 µm or more and 150 µm or less".

<Transparent Conductive Film>

Figure 1:
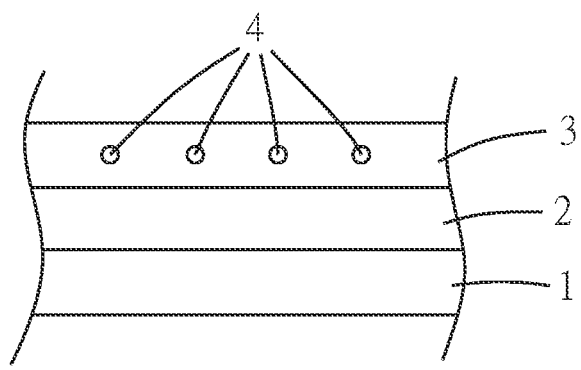
FIG. 1 is a schematic diagram of a transparent conductive film according to an embodiment of the present disclosure.

First, referring to FIG. 1, a transparent conductive film 10 according to an embodiment of the present disclosure will be described. As shown in FIG. 1, the transparent conductive film 10 includes a substrate 1, a metal nanowire layer 2, and a water blocking protective layer 3. The metal nanowire layer 2 is disposed on the substrate 1, and the water blocking protective layer 3 is disposed on the metal nanowire layer 2.

As far as the material of the substrate 1 is concerned, it can be selected from any one of the group consisting of polyethylene terephthalate (PET), cyclic olefin copolymer (COP), colorless polyimide (CPI), polyethylene naphthalate (PEN), polycarbonate (PC), and polyethersulfone (PES). In addition, a thickness of the substrate 1 may range from 15 µm to 125 µm, preferably from 25 µm to 100 µm, and more preferably from 30 µm to 50 µm. Here, if the thickness of the substrate 1 is less than 15 µm, it is not easy to operate in the process, the tension is not controlled well, and it is easy to cause film breakage, which increases the difficulty of the process. On the other hand, if the thickness of the substrate 1 is greater than 125 µm, it will affect the overall optics and flexibility.

Next, as far as the metal nanowire layer 2 is concerned, metal nanowire layer 2 includes metal nanowires covered by a capping layer. Any metal nanowires can be used, including but not limited to silver, gold, copper, nickel, and gilded silver. Among them, from the viewpoint of cost and conductivity, silver nanowires are preferred, and a manufacturing method for silver nanowires is described in U.S. Pat. Nos. 8,454,721B2 and 9,672,950B2, which are both incorporated herein by reference. The capping layer can be a polymer material with adhesive, for example, an acrylate resin such as epoxy acrylic, urethane acrylic, polyester acrylic, polyether acrylic resin, etc., which is used to fix the metal nanowires in order to form the metal nanowire layer 2. In addition, the thickness of the metal nanowire layer 2 is preferably 20-120 nm, more preferably 30-100 nm, and most preferably 40-90 nm, and the thickness can be measured by slicing a metal nanowire sample of the metal nanowire layer 2 followed by Scanning Electron Microscopy (SEM) cross-section analysis. With the metal nanowire layer 2 in this thickness range and the water blocking protective layer 3 (which will be described later), a better conductive effect can be achieved.

Furthermore, as far as the material of the water blocking protective layer 3 is concerned, the water blocking protective layer 3 is mainly includes polymer materials with a specific water permeability range, such as acrylic glue, silicone glue, polyolefin glue, polyurethane glue, rubber, epoxy glue, etc. In addition, the water blocking protective layer 3 includes water absorbing particles 4, and the volume percentage of the water absorbing particles 4 in the water blocking protective layer 3 is preferably 1% to 5%. There is no need to limit the relative volume of the water absorbing particles 4 if both the water absorbing effect and the visibility requirements can be obtained. As far as the water absorbing particles 4 are concerned, the water absorbing particles 4 can include polyolefin amide polymers, including but not limited to polyethylene modified by polyimide block copolymers and the like. The main colloidal structure of the aforementioned polyethylene modified by the polyimide block copolymer(s) contains 95-99% of a polyolefin segment, and the water absorbing functional group comes from the amine group that can combine with water. Surprisingly, the water absorbing particles 4 used in the present disclosure only need to be 1% to 5% by volume of the water blocking protective layer 3 to achieve both water absorbing properties that avoid open circuits and short circuits caused by the migration of metal (such as silver) ions and overall excellent visibility at the same time.

Compared with the prior art, in an embodiment of the present disclosure, by controlling the ratio of the water absorbing particles 4 to be less than 5% by volume of the water blocking protective layer 3, it can effectively avoid poor overall optical properties, especially the problem of an excessively high haze value. If the proportion of water absorbing particles 4 is greater than 5% by volume of the water blocking protective layer 3, the adhesion between the water blocking protective layer 3 and the metal nanowire layer 2 may be reduced, such that the overall structure of the transparent conductive film 10 will peel off when the transparent conductive film is bent, resulting in an open circuit. In addition, when the proportion of the water absorbing particles 4 is less than 1% by volume of the water blocking protective layer 3, the desired water absorbing effect cannot be obtained.

In addition, the thickness of the water blocking protective layer 3 is also related to the overall properties of the transparent conductive film 10. If the thickness of the water blocking protective layer 3 increases, the adhesion between the layers can be improved and peeling can be avoided. However, if the thickness of the water blocking protective layer 3 is too thick, the performance of the overall optical properties of the transparent conductive film 10 may be affected. Therefore, the thickness of the water blocking protective layer 3 is preferably 1-15 µm, more preferably 5-15 µm, and particularly preferably 5-10 µm. Here, if the thickness of the water blocking protective layer 3 is less than 1 µm, the metal of the metal nanowire layer 2 will be oxidized, which will affect the conductivity. On the other hand, if the thickness of the water blocking protective layer 3 is greater than 15 µm, the contact impedance will become high, which hinders the transmission of electrical signals.

In addition, while considering the thickness of the water blocking protective layer 3, it is still necessary to consider the filling rate of the water absorbing particles 4, so as not to affect the visibility (e.g. haze) of the transparent conductive film 10. Specifically, when the thickness of the water blocking protective layer 3 is less than 1 µm, the water blocking protective effect may not be fully exerted. On the other hand, when the thickness of the water blocking protective layer 3 is greater than 15 µm, the performance of the overall optical properties of the transparent conductive film 10 may be affected.

EXAMPLES

Hereinafter, the present disclosure will be specifically described with reference to Examples and Comparative Examples.

Reference Example

PET (manufactured by Toray Co., Ltd., U483) was used as the material of the substrate, and the thickness of the substrate was 50 µm. Next, a silver nanowire layer was coated on the substrate, and the thickness of the silver nanowire layer was nm. In the Reference Example, the transparent conductive film of the Reference Example was formed without coating the water blocking protective layer.

(Determination of Optical Properties)

The visible light transmittance (T %), haze (%) and yellowness (b* in CEILAB color space) of the transparent conductive film can be measured using conventional measurement methods. For example, the light transmittance and haze of the transparent conductive film was measured by the transmission method using a desktop transmission haze meter (made by BYK Gardner, Haze-guard plus), the transmission spectrum was measured by an ultraviolet/visible light spectrometer (made by PerkinElmer, Lambda 650) with a 150 mm integrating sphere, and the yellowness (b*) was calculated by the equation of the CIE standard observer function. In the present disclosure, the haze of the transparent conductive film needs to be 1.7% or less, the visible light transmittance (T %) is preferably 92-97%, and the yellowness (b*) is preferably 0.5 or less.

Next, according to the content of water absorbing particles and the thickness of the water blocking protective layer in the following table 1, the water blocking protective layer was further coated on the silver nanowire layer of the Reference Example to make the transparent conductive films of Examples 1-7 and Comparative Examples 1 to 2. The water blocking protective layer of each Example and Comparative Example was acrylic adhesive and contains polyethylene modified by a polyimide block copolymer with a specific content as the water absorbing particles. Afterwards, the measurement of optical properties was performed with respect to the transparent conductive films of the Reference Example, Examples 1 to 7, and Comparative Examples 1 to 2, and the results were summarized in Table 1 below.

Furthermore, as can be seen from Table 1, when the content of the water absorbing particles is large (about 5±0.5% by volume), if the thickness of the water blocking protective layer is 10 μm or 15 μm (referring to Comparative Examples 1 to 2), it can be found that the haze value rises rapidly (more than 1.7%), and in Comparative Example 2, the phenomenon that the yellowness is greater than 0.5 is also observed, so Comparative Examples 1 to 2 are not good. This phenomenon is due to the incompatibility of the polarities of the —CH group and the —NH group in the water absorbing particles. The content of the water absorbing particles in Comparative Examples 1 and 2 is too high and the water blocking protective layer is too thick, resulting in an increase in intermolecular hydrogen bonds, so that the molecular arrangement is disordered, which further makes the haze and yellowness increase rapidly. From this, it can be seen that under the condition that the content of the water absorbing particles is 1±0.5-2.5±0.5% by volume, even if the thickness of the water blocking protective layer is 15 μm, the haze value (1.7% or less) required by the present disclosure can be met. However, under the condition that the content of water absorbing particles is 5±0.5% by volume, when the thickness of the water blocking protective layer is 10 μm or 15 μm, the desired haze value (1.7% or less) of the present disclosure cannot be met.

Next, for the above phenomenon, further discussion is carried out. Please refer to FIG. 2, Table 2, and Table 3. FIG.

TABLE 1

| | | Ref. Ex. | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|---|
| Water blocking protective layer | Water absorbing particles | — | small | small | small | medium | medium | medium | large | large | large |
| | Thickness | — | 5 μm | 10 μm | 15 μm | 5 μm | 10 μm | 15 μm | 5 μm | 10 μm | 15 μm |
| Optical properties | Visible light transmittance (T %) | 93.5 | 93.4 | 93.4 | 93.2 | 93.2 | 93.3 | 93.2 | 92.9 | 92.6 | 92.4 |
| | Haze (%) | 0.46 | 0.48 | 1.03 | 1.55 | 0.56 | 1.09 | 0.56 | 1.28 | 2.94 | 2.98 |
| | Yellowness (b*) | 0.21 | 0.23 | 0.28 | 0.36 | 0.25 | 0.32 | 0.25 | 0.20 | 0.38 | 0.51 |

First, it can be seen from Table 1 that the transparent conductive film of the Reference Example has the lowest haze (0.46%) when the water blocking protective layer is not applied. However, due to the inherent electrolysis problem of nano-silver itself, the phenomenon of silver migration is likely to occur especially under the conditions of electricity and moisture, which further reduces the reliability of nano-silver. Therefore, the transparent conductive film of the Reference Example has a short lifetime (referring to the silver migration test that will be described later), and it is necessary to further coat a water blocking protective layer without affecting the optical properties as much as possible.

Secondly, as shown in Table 1, after coating the water blocking protective layer, although the water blocking protective layer has little effect on the visible light transmittance (e.g., transmittance of light having a wavelength between 400 nm and 700 nm), it has a greater impact on haze and yellowness. It can be known from Examples 1 to 6 that under the condition that the content of water absorbing particles is small (about 1±0.5% by volume) or medium (about 2.5±0.5% by volume), the thickness of the water blocking protective layer can be 5-15 μm, all of which can suppress the migration of silver ions under acceptable conditions (the haze value being below 1.7% and the yellowness being below 0.5).

2 is the FTIR spectra of the transparent conductive films of the Reference Example and Examples 1, 4, and 7. In addition, after normalizing the absorption spectrum intensity, the respective peak intensity values can be calculated from FIG. 2, and the respective spectral integrated areas can be calculated from FIG. 2 by the method of integrating absorption spectrum. The results are summarized in Tables 2 and 3 below.

TABLE 2

| | Ref. Ex. | Ex. 1 | Ex. 4 | Ex. 7 |
|---|---|---|---|---|
| The second absorption peak intensity | Nil | 0.180127 | 0.173252 | 0.378471 |
| The first absorption peak intensity | Nil | 0.999191 | 0.946306 | 0.921892 |
| Intensity ratio | — | 0.180 | 0.183 | 0.411 |

Figure 2:
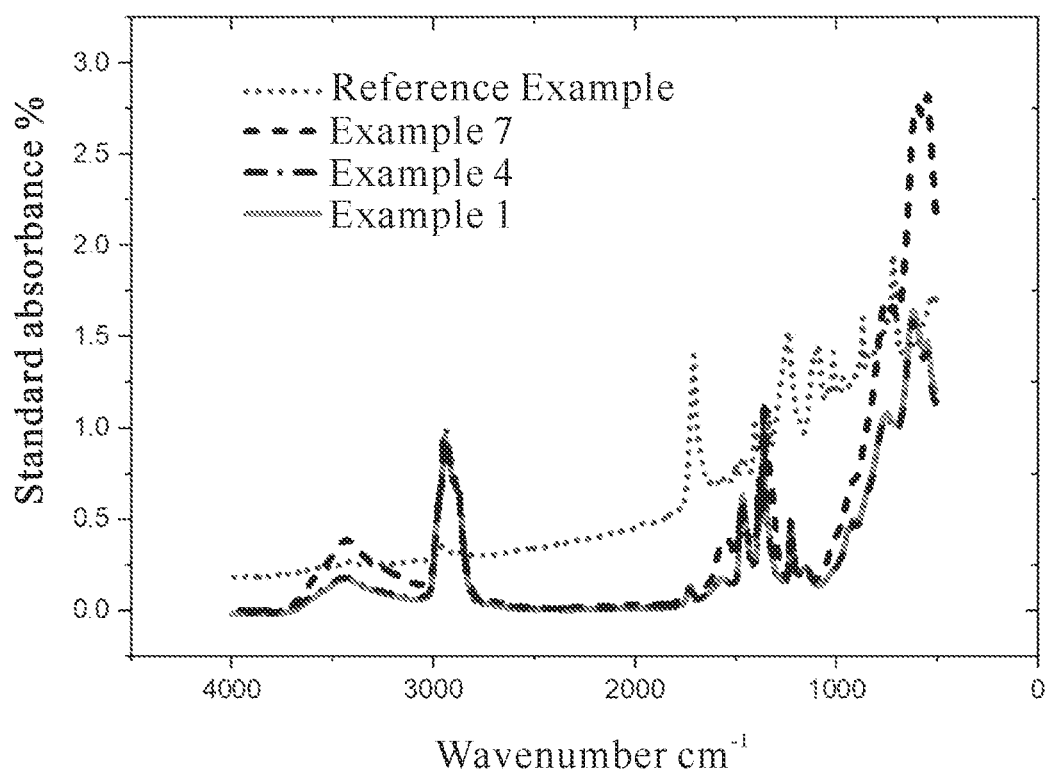
FIG. 2 is the FTIR spectra of the transparent conductive films of a Reference Example and Examples 1, 4, and 7.

As shown in FIG. 2, because the Reference Example is not coated with a water blocking protective layer, the characteristic peaks of the —CH group and the —NH group from the water absorbing particles are not observed. Further, as shown in FIG. 2, in Examples 1, 4, and 7, a characteristic peak of the —CH group is observed at a position of about 2945 cm$^{-1}$, and a characteristic peak of the —NH group is observed at a position of about 3450 cm$^{-1}$. In addition, the maximum intensities of the —CH group characteristic peaks of Examples 1, 4, and 7 range from 0.922 to 0.999, and there are little differences between the various embodiments. Comparatively, the maximum intensities of the —NH group characteristic peaks range from 0.173 to 0.378, and there are large differences between the various embodiments.

Further, in FIG. 2, the maximum peak intensity ratio (the second absorption peak/the first absorption peak) of the —CH group characteristic peak (the first absorption peak in the 2750 cm$^{-1}$-3000 cm$^{-1}$ wavenumber region) and the —NH group characteristic peak (the second absorption peak in the 3000 cm$^{-1}$-3750 cm$^{-1}$ wavenumber region) represents the ability to absorb water. The greater the maximum peak intensity ratio (also referred to as the intensity ratio), the better the water absorption capacity. In the present disclosure, the ratio of the maximum peak intensity of the first absorption peak to the second absorption peak ranges from 0.18 to 0.50. If the intensity ratio is less than 0.18, the sufficient water absorption/water blocking effect cannot be achieved because the number of N—H bonds is too low. Comparatively, if the intensity ratio is greater than 0.50, the optical properties may be degraded, and even when the thickness of the water blocking protective layer is low (e.g., 5 μm), the haze may be greater than 2%, which is unfavorable for the further application of the transparent conductive film.

Specifically, because the main component of the water absorbing particles used in the present disclosure includes polyimide, which is an organic polymer material containing an imine ring (—CO—NH—CO—), a molecular chain of the polyimide contains a large number of aromatic groups (such as benzene ring, imide bond, etc.). Therefore, in addition to excellent thermal stability and mechanical, electrical, and chemical properties, polyimide materials also have high water absorption properties.

In addition, as shown in FIG. 2 and the following Table 3, at the ratio of the spectral integrated area of the second absorption peak to the spectral integrated area of the first absorption peak (the spectral integrated area of the second absorption peak/the spectral integrated area of the first absorption peak) of 0.618-1.410, an appropriate balance between water absorption properties and optical properties can also be achieved.

TABLE 3

|  | Ref. Ex. | Ex. 1 | Ex. 4 | Ex. 7 |
| --- | --- | --- | --- | --- |
| Integral area of the second absorption peak | Nil | 71.553 | 74.688 | 165.863 |
| Integral area of the first absorption peak | Nil | 115.769 | 114.503 | 117.659 |
| Area ratio | — | 0.618 | 0.652 | 1.410 |

Next, by the following sample manufacturing method, it is proved that the present disclosure can inhibit the occurrence of the silver migration mechanism.

(Sample Manufacturing Method)

Figure 4:
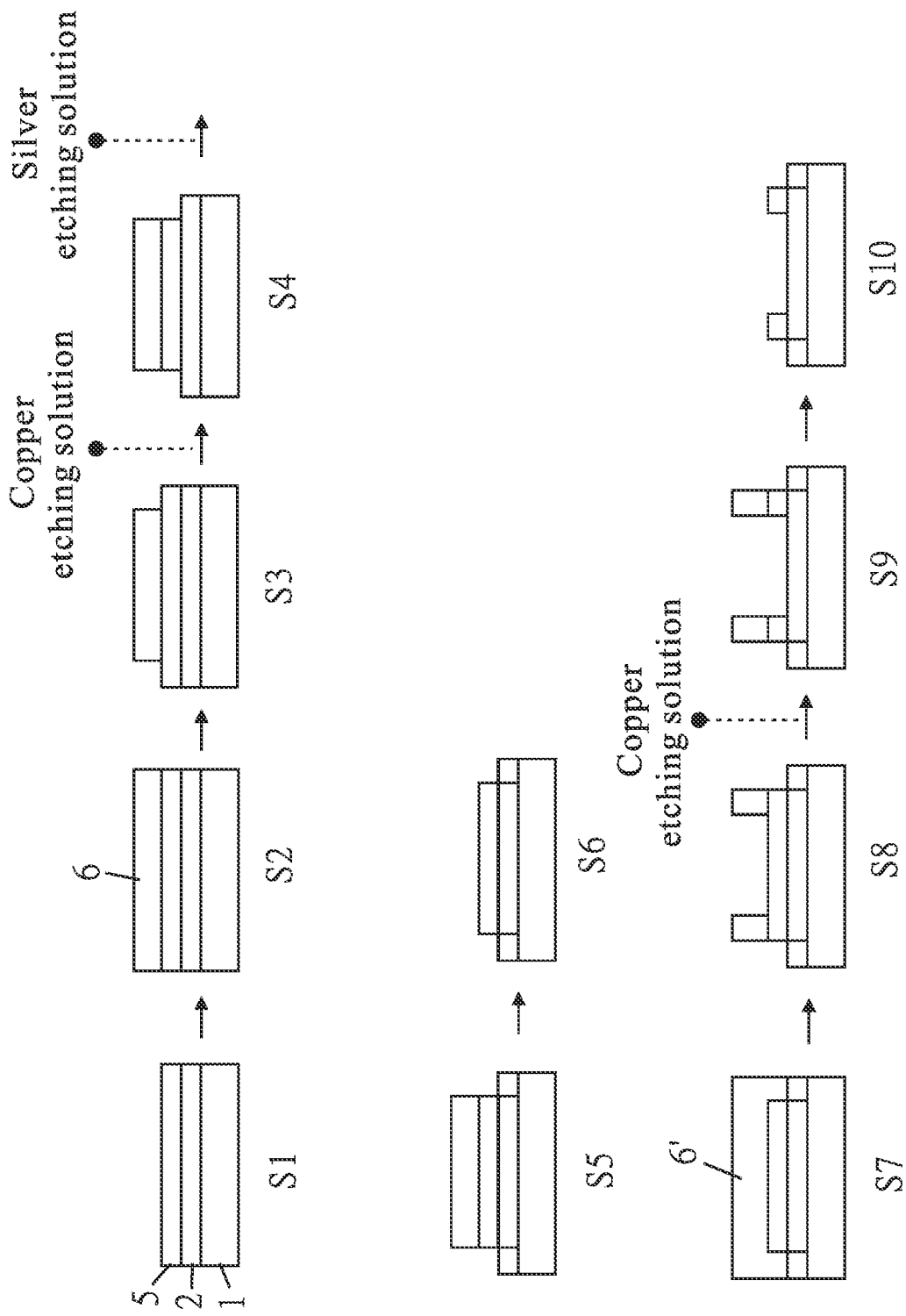
FIG. 4 is a flowchart of the production of silver migration test samples.

First, according to the flowchart of FIG. 4, samples for the silver migration test were prepared based on the Reference Example and Example 1, respectively. Specifically, the fabrication of the samples included nano-silver and copper pad patterning processes (S1-S6) and copper windowing processes (S7-S10).

S1: A metal copper layer 5 with a thickness of about 200 nm was sputtered on the metal nanowire layer (silver nanowire layer) 2 of the transparent conductive film of the Reference Example. In addition, a metal copper layer 5 with a thickness of about 200 nm was sputtered on the water blocking protective layer (not shown) of the transparent conductive film of Example 1.

S2: Following S1, a layer of photoresist 6 was coated on the respective copper layers 5.

S3: Following S2, the exposure and development process was performed by using a first mask to define the lines and electrode patterns of the silver nanowire layer and the copper pad (layer).

S4: Following S3, copper etching was performed using a copper etching solution to complete the fabrication of copper circuits and electrodes.

S5: Following S4, nano-silver etching was performed using a silver etching solution to complete the fabrication of silver nanowire electrodes.

S6: Following S5, the photoresist 6 was stripped and removed by using a stripping liquid, and the patterning process of the silver nanowire layer and the copper pad (layer) was completed.

S7: Following S6, a layer of photoresist 6' was coated on the transparent conductive film after the silver nanowire layer and copper pads were patterned.

S8: Following S7, the exposure and development process was performed using a second mask to define the copper windowing pattern.

S9: Following S8, copper etching was performed using a copper etching solution.

S10: Finally, after S9, the photoresist 6' was stripped and removed by using the stripping liquid, and the copper windowing process was completed to obtain the samples for the silver migration test.

The samples of each silver migration test were placed in an environment of high temperature and high humidity (85° C./85%), and a direct current (DC) and a voltage of 5 volts were applied to track the variance of the resistance of the silver nanowire in the silver nanowire layer with respect to time under these test conditions. The width of the silver nanowire electrodes is 100 μm, and the spacing (gap distance) between the silver nanowire electrodes is 50 μm. Please refer to FIG. 3 and FIG. 5 for the results of the silver migration test. In addition, the gap distance between the silver nanowire electrodes can be adjusted between 30 μm and 200 μm.

Figure 3:
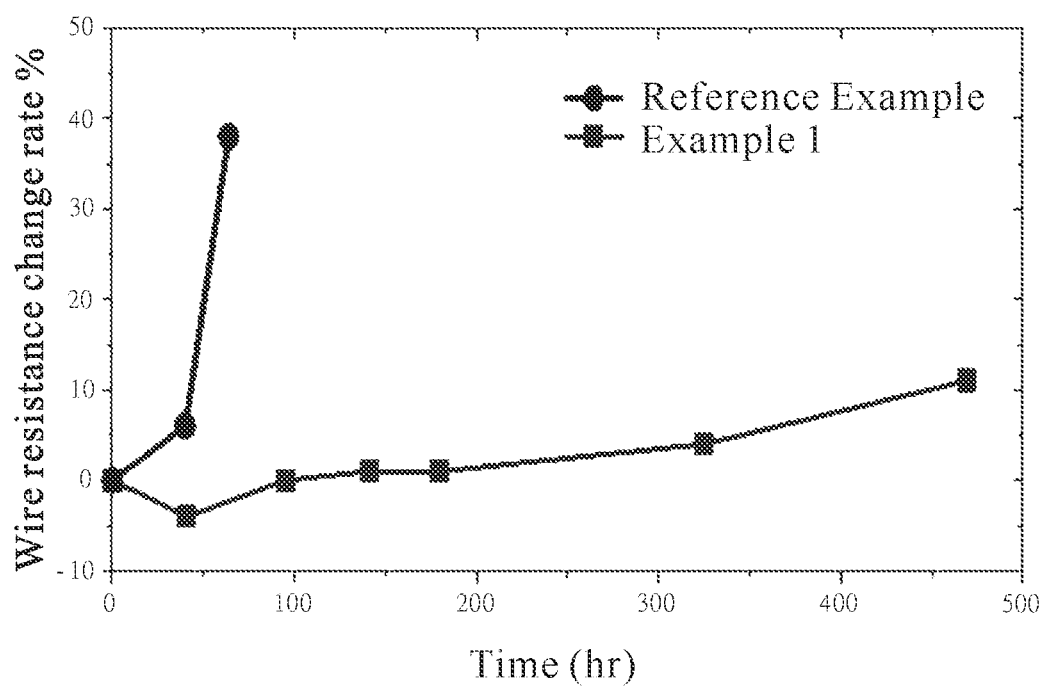
FIG. 3 is the silver migration test diagram of the Reference Example and Example 1.

FIG. 3 is a graph of the silver migration test of the Reference Example and Example 1. As shown in FIG. 3, the wire resistance change rate of the transparent conductive film of the Reference Example is greater than 10% after the power is on for about 45 hours. In contrast, the wire resistance change rate of the transparent conductive film of Example 1 is only greater than 10% after the power is on for about 450 hours. It can be seen from this that, compared with the transparent conductive film of the Reference Example, the transparent conductive film of Example 1 has a lifetime (the time point until the wire resistance change rate increases to more than 10%) that can be extended by about 10 times, from 45 hours to 450 hours, under the severe silver migration test conditions (DC and a voltage of 5V, high temperature and high humidity environment 85° C./85%). In addition, the wire resistance change rate of the transparent conductive film of Example 1 is only about 8% after the power is on for about 400 hours.

Figure 5:
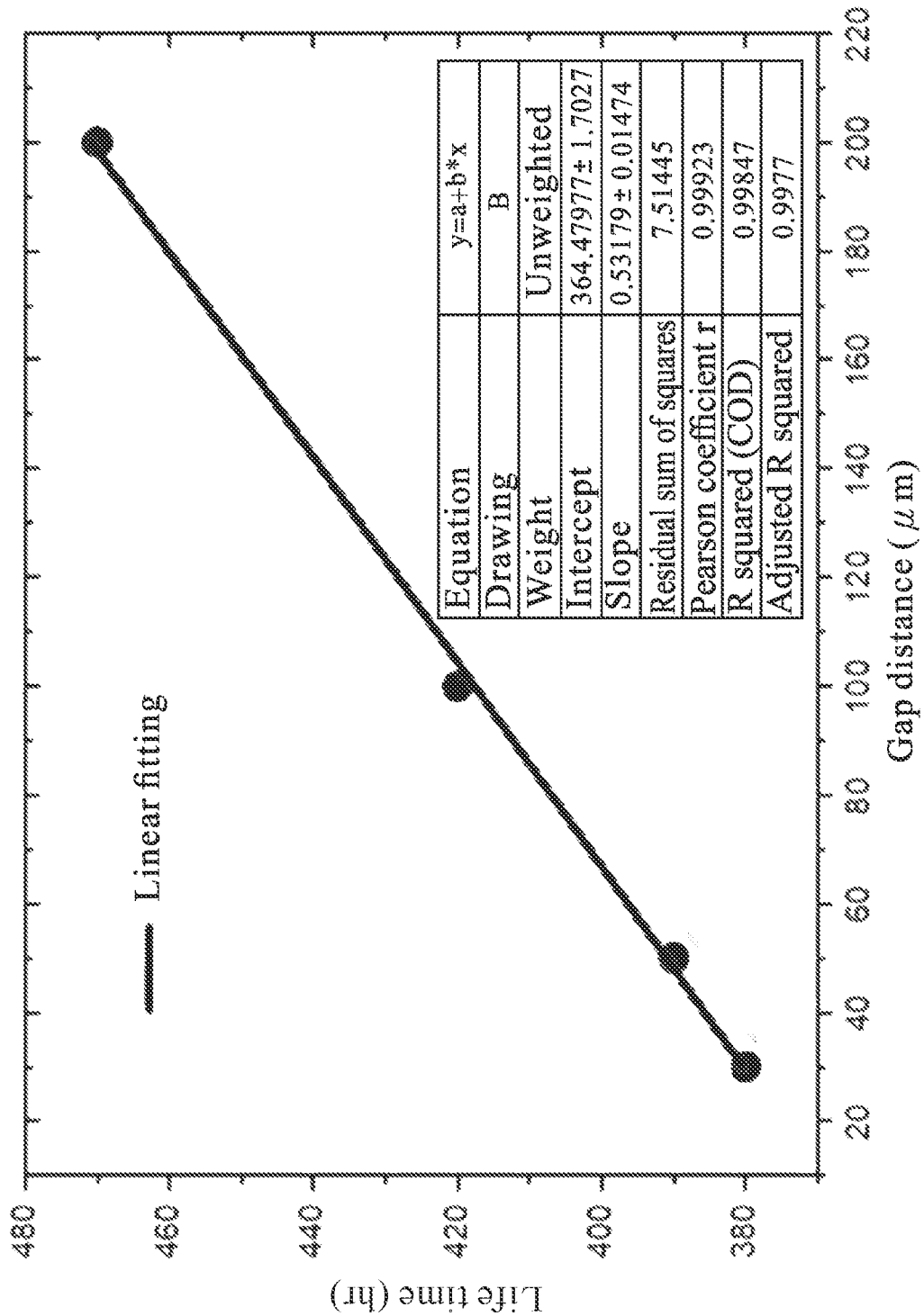
FIG. 5 is a graph showing the relationship between gap distance and lifetime of silver migration test samples.

Further, as shown in FIG. 5, since the line width of the electrodes generally does not affect the migration of silver ions, the tests are carried out under conditions that the fixed line width is 100 μm and the gap distance is 30 μm, 50 μm, 100 μm, and 200 μm, respectively, and the resistance change rates at 380 hr, 390 hr, 420 hr, and 470 hr are less than 10% when passing the test. Therefore, it can be seen that the gap distance has a linear relationship with the lifetime, and the relationship can be expressed as y=0.53179x+364.47977 (x=gap distance, y=lifetime).

It can be seen from the above results that the reliability of the transparent conductive film of the present disclosure is greatly improved by using the water blocking protective layer, which can further improve the stability of the silver nanowire layer in electronic product performances.

The transparent conductive film of the present disclosure can be applied to a touch sensing electrode of a touch sensor. In addition, it can also be applied to flat/flexible touch displays, organic photovoltaics (OPV), organic light emitting diode (OLED) lighting, smart windows, and other products that may include the transparent conductive film.

In summary, the transparent conductive film of the present disclosure and its application have at least the following excellent technical effects:

1. The transparent conductive film of the present disclosure has the effect of being bendable and can maintain interlayer adhesion without impairing the conductivity of the conductive layer.
2. The transparent conductive film of the present disclosure can suppress the migration of silver ions in harsh environments and can have excellent visibility effects, especially obvious in the haze characteristic, without sacrificing conductivity.

The present disclosure is not limited to the above-mentioned embodiments, and various modifications can be made within the scope shown in the claims, and the embodiments obtained by appropriately combining the technical means disclosed in the different embodiments also fall within the technical scope of the present disclosure.

What is claimed is:

1. A transparent conductive film comprising:
   a substrate;
   a metal nanowire layer disposed on the substrate; and
   a water blocking protective layer, which has water absorbing particles and is disposed on the metal nanowire layer;
   wherein the transparent conductive film has a first absorption peak in a 2750 $cm^{-1}$ to 3000 $cm^{-1}$ wavenumber region and a second absorption peak in a 3000 $cm^{-1}$ to 3750 $cm^{-1}$ wavenumber region using Fourier-transform infrared spectroscopy (FTIR) detection, a ratio of a maximum peak intensity of the second absorption peak to a maximum peak intensity of the first absorption peak ranges from 0.18 to 0.50, and a haze value of the transparent conductive film is 1.7% or less, and a volume percentage of the water absorbing particles in the water blocking protective layer ranges from 1% to 5%.

2. The transparent conductive film of claim 1, wherein a ratio of a spectral integrated area of the second absorption peak to a spectral integrated area of the first absorption peak ranges from 0.618 to 1.410.

3. The transparent conductive film of claim 1, wherein the transparent conductive film comprises a plurality of electrodes formed by metal nanowires.

4. The transparent conductive film of claim 3, wherein a gap distance between the plurality of electrodes ranges from 30 μm to 200 μm.

5. The transparent conductive film of claim 4, wherein under test conditions of direct current, a voltage of 5V, and a high temperature and high humidity environment of 85° C./85%, when the gap distance is x μm and power is on for y hr, a wire resistance change rate of the transparent conductive film is lower than 10%, wherein x and y conform to the following relationship: y=0.53179x+364.47977.

6. The transparent conductive film of claim 1, wherein under test conditions of direct current, a voltage of 5V, and a high temperature and high humidity environment of 85° C./85%, when power is on for 400 hr, a wire resistance change rate of the transparent conductive film is lower than 10%.

7. The transparent conductive film of claim 1, wherein a visible light transmittance of the transparent conductive film ranges from 92% to 97%.

8. The transparent conductive film of claim 1, wherein a yellowness of the transparent conductive film is below 0.5.

9. The transparent conductive film of claim 1, wherein a thickness of the water blocking protective layer ranges from 1 μm to 15 μm.

* * * * *